United States Patent Office 3,676,291
Patented July 11, 1972

3,676,291
POLYESTERAMIDES
Ray C. Christena, Wichita, and Earnest L. Johnston, Clearwater, Kans., assignors to Vulcan Materials Company, Birmingham, Ala.
No Drawing. Filed Aug. 31, 1970, Ser. No. 68,492
Int. Cl. B32b *17/10, 27/36*; C08g *20/30*
U.S. Cl. 161—195               12 Claims

ABSTRACT OF THE DISCLOSURE

A polyesteramide of the formula:

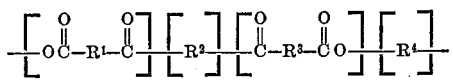

wherein:
$R^1$ is chlorinated or brominated alkylene, or chlorinated or brominated arylene;
$R^2$ is aminoalkyleneoxy or oxyalkyleneamino;
$R^3$ is alpha-beta ethylenically unsaturated alkylidene; and
$R^4$ is alkylene or alkylidene.

CROSS REFERENCE TO RELATED APPLICATIONS

The polyesteramides described and claimed herein can also be produced by the process described and claimed in my application entitled "Aziridine Salts And Processes for Producing Polyesteramides Therefrom," Ser. No. 68,493, filed concurrently herewith.

DISCLOSURE

This application relates to polyesteramides of Formula I:

(I) 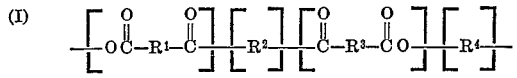

wherein $R^1$, $R^2$, $R^3$ and $R^4$ have the meanings described below.

$R^1$ is chlorinated or brominated alkylene, or chlorinated or brominated arylene; and is preferably a tetrachlorophenylene, tetrabromophenylene or the radical of Formula II:

(II) 

by which it is meant to refer to the residue of 1,4,5,6,7,7-hexachlorobicyclo[2.2.1]-5-heptene -2,3-dicarboxylic acid commercially available as chlorendic acid or Het acid.

In the polyesteramides of Formula I, $R^2$ is aminoalkyleneoxy or oxyalkyleneamino; and is preferably the divalent radical of Formula III or of Formula IV:

(III) 

(IV) 

wherein $R^5$ is hydrogen or lower alkyl, preferably methyl. In the most preferred embodiment $R^5$ is hydrogen.

In the above-described polyesteramides $R^3$ is alpha-beta ethylenically unsaturated alkylidene and is preferably a divalent radical of the Formula V or Formula VI:

(V) 

(VI) 

wherein $R^6$ is hydrogen or lower alkyl, preferably methyl. $R^6$ is most preferably hydrogen.

Optimum polyesteramides are those of Formula VII:

(VII) 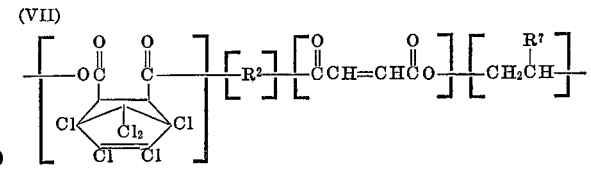

wherein $R^2$ a radical of Formula III or IV and $R^7$ is hydrogen or methyl.

The brackets in Formulae I and VII are meant to indicate a linear polymer having recurring ester and amide linkages in the backbone thereof. The brackets are not meant to indicate that the reactants described below which produce these recurring units must necessarily be present in the preferred ratio of 1:1:1.

The polyesteramides of the present invention can be produced by a wide variety of processes known to those skilled in the art, but are preferably produced by the process described and claimed in the above-identified concurrently filed application. Pursuant to the description in that application a dicarboxylic acid of Formula VIII:

(VIII) 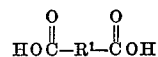

is reacted with an aziridine compound of Formula IX:

(IX) 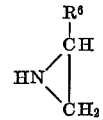

to produce an aziridine salt of Formula X:

(X) 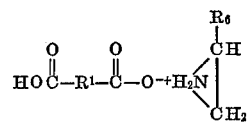

The salt is then reacted with an alpha-beta ethylenically unsaturated acid of Formula XI.

(XI) 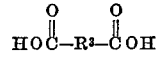

and with a dihydric alcohol of Formula XII:

(XII)        HO—$R^4$—OH

The above described reactants can be combined in widely varying molar ratios, however, the ratio of the dicarboxylic acid of Formula XI to the dihydric alcohol of Formula XII is generally between 15:10 and 10:15 and preferably between 10:11 and 11:10 in order to achieve high molecular weight. The aziridine salt of Formula X can be present in widely varying ratios since it does not affect the stoichiometry of the reaction. However, the ratio of the salt of Formula X to the dicarboxylic acid of Formula XI is generally between 10:1 and 1:10 and preferably between 3:1 and 1:3. The reaction is simply effected by charging the above described reactants to a reaction vessel equipped with a mechanical stirrer, a thermometer, and a water separation trap. The reaction is continued under reflux conditions until the stoichiometric amount of water has been removed.

Examples of suitable dicarboxylic acids of Formula VIII include among other 2,2,3,3-tetrachlorosuccinic acid, 2,2,4,4 - tetrachloroadipic acid, tetrachlorophthalic acid, tetrabromophthalic acid, and chlorendic acid. These latter three are preferred because of cost, availability, and the stability of their corresponding aziridine salts. Anhydrides corresponding to the acids of Formula VIII are unsuitable because they do not form the aziridine salts of Formula X.

Examples of suitable aziridine compounds of Formula IX include among others ethylenimine (aziridine), 2-methyl aziridine, 2-phenyl aziridine, 2,2-dimethyl aziridine, 2-benzyl aziridine and 2-dodecyl aziridine. Ethylenimine is preferred because of cost, availability and reactivity, although 2-methyl aziridine has also been found to be suitable for certain specialized applications.

Examples of suitable alpha-beta ethylenically unsaturated dicarboxyic acids of Formula XI include among others glutaconic acid, itaconic acid, citraconic acid, mesaconic acid, fumaric acid and maleic acid. Maleic acid is preferred because of cost, availability, and reactivity and the ease with which its double bond undergoes addition polymerization after the maleic acid has been introduced into the backbone of the polymer. The corresponding anhydrides of the acids of Formula XI can be employed.

Examples of suitable dihydric alcohols include among others ethylene glycol, diethylene glycol, 1,2-propylene glycol, dipropylene glycol, 1,3-propylene glycol, 1,3-butylene glycol, 1,2-butylene glycol, neopentyl glycol, 1,3-pentanediol, 1,4-butenediol, and 1,5-pentanediol. Ethylene glycol is preferred because of cost, availability, reactivity and the small amounts of additional carbon which this compound introduces into the polymer. Higher polyhydric alcohols such as trimethylol propane and pentaerythritol can be used in minor amounts which do not materially alter the linear nature of the polyesteramide.

Alternative methods for producing the polyesteramides of the present invention will immediately become apparent to those skilled in the art by reference to the structure of Formula 1. For example an aminoalkyl ester of Formula XIII:

(XIII) 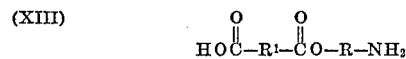

wherein R is alkylene, can be reacted with an alpha-beta ethylenically unsaturated dicarboxylic acid of Formula XI and a dihydric alcohol of Formula XII.

Yet another alternative method is to react a hydroxy amide of Formula XIV:

(XIV) 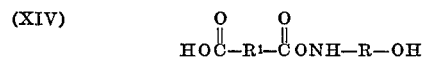

wherein R is alkylene with an alpha-beta ethylenically unsaturated dicarboxylic acid of Formula XI and a dihydric alcohol of Formula XII.

By reference to the structure of the polyesteramides of the present invention those skilled in the art will immediately recognize other processes by which they can be produced, such as by modification of the known prior art processes such as those described in the following U.S. patents: 2,463,977; 2,490,001; 2,490,002; 2,490,003; 2,490,004; 2,490,005; 2,495,172; 2,523,999; 2,806,822; 3,036,974; 3,354,126.

The polyesteramides of the present invention can be copolymerized with one or more vinyl monomers. Examples of suitable vinyl monomers include among others vinyl toluene, acrylic acid, methyl acrylate, 2-ethylhexyl acrylate, acrylonitrile, methyl methacrylate, n-butyl acrylate, mono-chlorostyrene, ethyl acrylate, ethyl methacrylate, acrolein, vinyl acetate, vinylidene chloride, vinyl chloride, vinyl bromide, and styrene which is preferred because of cost, availability and reactivity and the fact that it does not adversely affect the physical properties of cured compositions of these polyesteramides. The polyesteramide and the vinyl monomer can be mixed in widely varying weight ratios such as 1:10 to 10:1 but are preferably combined in ratios of 3:1 to 1:3. In a preferred embodiment of the present invention wherein the mixture of polyesteramide and vinyl monomer when cured must be flame retardant the polyesteramide and the vinyl monomer are mixed in a quantity such that the halogen content of the mixture is greater than 10 and preferably greater than 20 weight percent.

In order to maintain the stability of the mixture of polyesteramide and vinyl monomer it is conventional to employ a free radical trap such as hydroquinone. In order to cure these compositions, a free radical initiator such as benzoyl peroxide, methyl ethyl ketone peroxide or azobisisobutyronitrile is added to the mixture. Accelerators such as cobalt naphthenate can also be employed as is well known in the art.

The polyesteramides of the present invention especially when mixed with the above-described vinyl monomers provide a cross-linkable composition which is especially useful for the bonding of fiber glass and fiber glass laminates. When so used, it provides an effective substitute for polyester resins commonly employed for such purposes in the past.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE I

This example illustrates the synthesis of a salt of Formula XV:

(XV) 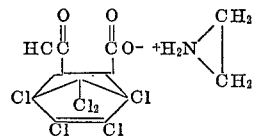

To a three-neck, 2-liter flask equipped with stirrer, thermometer, dropping funnel, and cooling bath was added 388.87 g. (1.00 mole) of chlorendic acid in 1200 ml. very dry acetone. To the above was added 43.07 g. (1.00 mole) of ethylenimine dropwise at such a rate that the temperature was 16–20° C. When about half the ethylenimine was added, the solid salt started to precipitate out. After all evidence of exotherm disappeared, the solids were filtered off and air dried at room temperature in a hood, followed by drying in a vacuum oven at ambient temperature to give a white solid, M.P. 149–150° C., yield 98.9 percent.

Amine equivalent—Calcd. for $C_{11}H_9Cl_6NO_4$: 431.91. Found: 434.

Carboxyl equivalent—Calcd. for $C_{11}H_9Cl_6NO_4$: 215.95. Found: 213.

The salt was stored at 5° C. to prevent gradual rearrangement to the mono-2-aminoethyl chlorendate.

EXAMPLE II

This example illustrates the synthesis of a salt of Formula XVI:

(XVI) 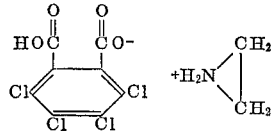

Using equipment as in Example I, 312.93 g. (1 mole) of tetrachlorophthalic acid hemihydrate was dissolved in 1750 ml. dry acetone. To this was added 43.07 g. (1 mole) ethylenimine, dropwise at 17–20° C. The reaction mixture was filtered to give a white solid after air and vacuum drying, at ambient temperature, M.P. 120–124° C.

Amine equivalent—Calcd. for $C_{10}H_8NO_{4.5}$: 356.6. Found: 352.0.

Carboxyl equivalent—Calcd. for $C_{10}H_8NO_{4.5}$: 178.0. Found: 187.5.

EXAMPLE III

This example illustrates the synthesis of a salt of Formula XVII:

(XVII)
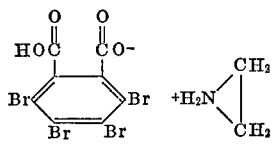

The procedure of Example II is repeated employing the same conditions, times and ingredients except that the tetrachlorophthalic acid hemihydrate is replaced by an equimolar amount of tetrabromophthalic acid hemihydrate.

EXAMPLE IV

Preparation of a polyesteramide using the mono salt of chlorendic acid and ethylenimine Preparation of the polyesteramide was accomplished in a conventional reactor equipped with thermometer, stirrer, full condenser, partial condenser to contain glycol vapors, nitrogen sparge and source of vacuum.

The procedure procedure used to prepare the polyesteramide was to charge the salt and maleic anhydride to the reactor along with xylene as an azeotroping agent. Heating resulted in reaction of the solid salt with maleic anhydride as evidenced by a rapid exotherm after which stage all materials were in liquid form. This first phase of the reaction was followed by determination of amine number defined as milligrams of perchloric acid per gram of sample. When the amine number was very low (3–5), the glycol was charged to the reactor, the temperature further elevated, and water was azeotropically distilled over as the reaction proceeded. This second phase was followed by determination of acid numbers. The reaction was run until acid number approached 25 to 50. At this point, vacuum was applied to remove excess glycol, remaining water and xylene. After this, vacuum was removed, inhibitor was added, the product was cooled and styrene was added to give a 60–70 percent solution of the polyesteramide in styrene. The final liquid product could be cured to a solid at elevated temperature using a free radical curing agent such as benzoyl peroxide or at room temperature using cobalt napthenate and methyl ethyl ketone peroxide.

A specific example follows: To the reactor, using a nitrogen blanket, was charged 566.56 g. (1.31 moles) of the chlorendic acid-ethylenimine salt along with 128.64 g. (1.31 moles) of maleic anhydride in 360 ml. xylene. Heating was started and the temperature rose to 123° C. over a 50-minute period with exothermimg. Continued heating for another hour increased the temperature to 137° C. resulting in an amine number of 3.0. At this point, 56 mg. (50 p.p.m.) of mono-tertiary butyl hydroquinone (MTBHQ) was added and 104.8 g. (1.38 moles) of propylene glycol was charged to the reactor. Heating was continued for another 1.5 hours until the temperature rose to 155° C., resulting in an acid number of 55 and an amine number of 2.3. Vacuum (34 mm.) was applied and any remaining water, excess glycol, and xylene were distilled over resulting in an amine number of 3.4 and an acid number of 37. The vacuum was removed, 224 mg. (200 p.p.m.) of toluhydroquinone (THQ) was added and the reaction product cooled to 112° C. at which point 357 g. of styrene was added to make a 68 percent solution of the polyesteramide in styrene. The final product was filtered resulting in a light orange colored liquid.

EXAMPLE V

Preparation of polyesteramide using the mono salt of tetrachlorophthalic acid and ethylenimine To a reactor, as in Example IV, was charged 59.84 g. (0.79 mole) propylene glycol, 250 ml. xylene, 266.72 g. (0.75 mole) of the tetrachlorophthalic acid-ethylenimine salt, and 73.44 g. (0.75 mole) maleic anhydride. Using a nitrogen blanket, the reactor was heated to 150° C. over a 4-hour period at which point the acid number was 50. One gram of PbO was added as a catalyst and heating continued for 3.5 hours with temperature rise to 172° C. while under vacuum (28 mm.). Vacuum was removed, the reaction mixture was cooled to 130° C., 58 mg. toluhydroquinone (THQ) added, and cooling continued to 100° C. Styrene (172 ml.) was added to yield a 70 percent solids solution of the polyesteramide in styrene.

The polyesteramide can be represented by Formula XVIII:

(XVIII)
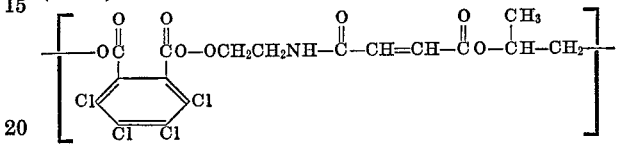

EXAMPLE VI

Preparation of polyesteramide using mono salt of chlorendic acid and ethylenimine and neopentyl glycol To a reactor, as in Example IV, was charged 250 ml. xylene, 92.04 g. (0.94 mole) of maleic anhydride, 8.3 g. of tris (2-chloroethyl) phosphite and 405.36 g. (0.94 mole) of the mono salt of chlorendic acid and ethylenimine. Using a nitrogen blanket, the reactor was heated to 116° C. with exotherming over a 0.75-hour period at which stage all reactants were in liquid form. Continued heating to 132° C. over a 3-hour period resulted in a product with an amine number of 2.1. At this point, 102.60 g. (0.98 mole) of 96 percent neopentyl glycol was added to the reaction vessel. Continued heating to 153° C. over a 2.3-hour period resulted in a product with an acid number of 50. Vacuum (3–6 mm.) was applied and any excess water, glycol and xylene distilled off. The vacuum was removed and the product cooled to 135° C. Mono tertiary butylhydroquinone 30 mg. (50 p.p.m.) was added at 135° C. At 115° C., 120 mg. (200 p.p.m.) toluhydroquinone was added. At 108° C., 271 ml. of styrene was added to yield a 70 percent solids solution of the polyesteramide in styrene.

EXAMPLE VII

Preparation of polyesteramide using mono salt of chlorendic acid and ethylenimine and ethylene glycol To a reactor, as in Example IV, was charged 40 ml. xylene, 57 mg. (100 p.p.m.) tertiary butyl catechol (TBC), 64.28 g. (1.04 moles) ethylene glycol, 46.76 g. (0.22 mole) trimethylol propane diallyl ether and 53.48 g. (0.55 mole) maleic anhydride. Using a nitrogen blanket the reactor was heated to 96° C. over an 0.8-hour period. At this point, 235.48 g. (0.55 mole) of the chlorendic acid-ethylenimine salt was added. Exotherming started and heating was continued until the temperature rose to 137° C. over a 2.5-hour period where the acid number was 43. Vacuum (42 mm.) was applied and any excess water, glycol, ether, or xylene was distilled off. The vacuum was removed and the product cooled to 68° C. TBC 114 mg. (200 p.p.m.) plus 188 ml. of styrene was added to yield a 67.2 percent solids solution of the polyesteramide in styrene. Final acid number was 28 and the amine number was 4.9.

The polyesteramide can be represented by Formula XIX:

XIX)
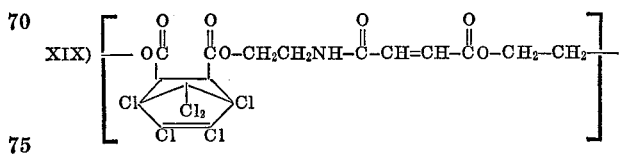

EXAMPLE VIII

Preparation of polyesteramide using mono salt of chlorendic acid and ethylenimine and 2-butene-1,4-diol To a reactor, as in Example IV, was charged 250 ml. xylene, 8.3 g. tris (2-chloroethyl) phosphite, 94.56 g. (0.96 mole) maleic anhydride and 416.32 g. (0.96 mole) chlorendic acid-ethylenimine salt. Using a nitrogen blanket, the reactor was heated with exotherming to 118° C. over a one-hour period where all reactants were in liquid form. Continued heating to 133° C. over a 3.3-hour period gave a product with an amine number of 3.8. Butenediol 89.16 g. (1.01 moles) was added. Further heating to 153° C. over a 2.1-hour period yielded a product with acid number of 52. Vacuum (23 mm.) was applied and any excess water, glycol, or xylene was distilled off. Vacuum was removed and the product cooled to 140° C. where 63 mg. (75 p.p.m.) mono tertiary butyl hydroquinone was added. At 120° C., 211 mg. (250 p.p.m.) toluhydroquinone was added. At 112° C., 269 ml. styrene was added yielding a 70 percent solids solution of polyesteramide in styrene.

EXAMPLE IX

Fiber glass laminates made with polyesteramides

The polyesteramide made in Example IV was used as the binder in 12″ x 12″ x 1/8″ fiber glass laminates. One laminate (No. 1) was made using 12 plies of type 181 glass cloth treated with methacrylato chromic chloride in isopropanol ("Volan A"). Another laminate (No. 2) was made using 12 plies of untreated type 181 glass cloth. A third laminate (No. 3) was made with 12 plies of Volan A treated type 181 glass cloth using a polyester resin made of equivalent amounts of chlorendic acid as compared to the chlorendic acid-ethylenimine salt used in the first two laminates. Data on the three laminates follows:

| Laminate | Tensile strength, p.s.i. | Modulus, p.s.i. | Resin content, percent | Chlorine content, percent | | Cloth |
|---|---|---|---|---|---|---|
| | | | | Resin | Laminate | |
| No. 1 | 35,381 | 2.95×10⁶ | 43.34 | 25.80 | 11.18 | Treated. |
| No. 2 | 42,124 | 2.69×10⁶ | 42.49 | 25.80 | 10.96 | Untreated. |
| No. 3 | 40,163 | 3.08×10⁶ | 40.60 | 25.18 | 10.22 | Treated. |

It has been observed in our work that qualitatively polyesteramides have good adhesion to glass. Polyesters do not have good adhesion except to specially treated glass coated with a coupling agent such as Du Pont's Volan A. Comparison of laminates No. 1, 2, and 3 shows that tensile properties are approximately the same and that addition of the amide group is not deleterious.

The laminates were prepared by the hand lay-up method. Curing of the resin was accomplished with 2.5 percent Lupersol DDM initiator (60% methyl ethyl ketone peroxide in dimethyl phthalate) and 0.3 percent "Uversol Cobalt Liquid 6 Percent." Curing was effected at room temperature in a press at 460 p.s.i. for 16 hours, followed by a post cure for 8 hours in an oven at 150° F.

Fiber glass laminates were also made from resins made with phthalic acid-ethylenimine salt and also neopentyl glycol.

EXAMPLE X

Preparation of mono 2-aminoethyl chlorendate

To a reaction vessel was added 200 g. of the mono salt of chlorendic acid and ethylenimine as made in Example I. The salt was warmed with stirring in 600 ml. methanol to 63° C. On cooling to 17° C. and on standing overnight 235 g. (78% yield) of 2-aminoethyl chlorendate precipitated out. The M.P. of the white solid was 193–195° C. Recrystallized material melted around 200° C.

Amine equivalent—Calcd. for $C_{11}H_9Cl_6NO_4$: 431.9. Found: 446.

Carboxyl equivalent—Calcd. for $C_{11}H_9Cl_6NO_4$: 431.9. Found: 431.0.

Ethanol may also be used as solvent medium.

EXAMPLE XI

Preparation of polyesteramide using mono-2-aminoethyl chlorendate

To a reactor, as in Example IV, was charged 122.32 g. (1.15 moles) of diethylene glycol in 40 ml. xylene, 226.28 g. (0.52 mole) mono salt of 2-aminoethyl chlorendate, and 51.40 g. (0.52 mole) maleic anhydride. Using a nitrogen blanket, the reactor was heated to 117° C. over a 1.5-hour period at which time all reactants were in liquid form. Continued heating to 165° C. over a 4-hour period resulted in a polyesteramide having an acid number of 37. Vacuum (70 mm.) was applied and any excess glycol, water, and xylene distilled off. The vacuum was removed, and the product was cooled to 100° C. where 40 mg. (72 p.p.m.) tertiary butyl catechol (TBC) was added. After further cooling to 63° C., 188 ml. styrene was added to yield a 69.2 percent solids solution of the polyesteramide in styrene.

The polyesteramide can be represented by Formula XX:

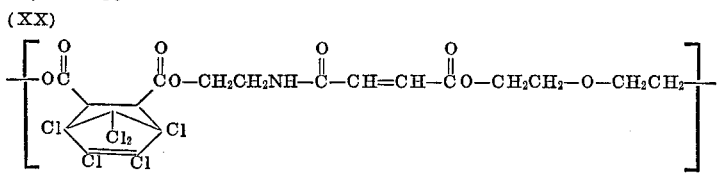

(XX)

EXAMPLE XII

Preparation of mono 2-hydroxyethylamide of chlorendic acid

To a reaction vessel equipped with reflux condenser, thermometer, and stirrer was added 600 g. of the mono salt of chlorendic acid and ethylenimine and 1000 ml. of glacial acetic acid. The mixture was heated to 113° C. over a 2½-hour period. After cooling, the contents were poured out and crystals separated yielding:

| Fraction | G. | M.P., °C. | Amine equiv. | Anal. carboxyl equiv. |
|---|---|---|---|---|
| 1 | 213.0 | 162-168 | 0 | 434.6 |
| 2 | 274.5 | 156-163 | 0 | 436.0 |
| 3 | 39.5 | 132-139 | 0 | 416.0 |

Calculated carboxyl equivalent of the 2-hydroxyethyl amide of chlorendic acid is 431.9 and the calculated amine equivalent is zero.

EXAMPLE XIII

Preparation of polyesteramide using mono 2-hydroxyethylamide of chlorendic acid

To a reactor, as in Example IV, was charged 93.12 g. (1.22 moles) propylene glycol, 50 ml. xylene, 249.76 g. (0.58 mole) mono 2-hydroxyethylamide of chlorendic acid, and 57.12 g. (0.58 mole) maleic anhydride. Using a nitrogen blanket, the reactor was heated to 134° C. over a 2.3-hour period where all reactants were in water white liquid form. Continued heating to 171° C. over a 2.3-hour period resulted in light yellow polyesteramide with acid number of 43. Vacuum (34 mm.) was applied and any remaining water, glycol and xylene distilled off. Vacuum was removed and the product was cooled to 100° C. and 60 mg. (105 p.p.m.) tertiary butyl catechol (TBC) was added. On further cooling to 66° C., 188.4 ml. styrene was added to yield a 69.2 percent solids solution of the polyesteramide in styrene. On overnight standing and cooling, 20 g. of unreacted 2-hydroxyethyl amide of chlorendic acid precipitated out and this was filtered off to yield a polyesteramide which on curing yielded a clear and close to water-white resin, the lightest in color of the series.

The polyesteramide can be represented by Formula XXI:

(XXI)

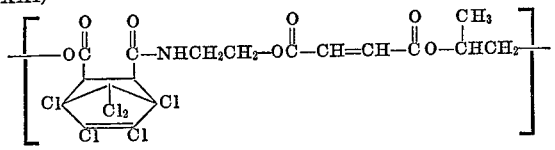

EXAMPLE XIV

This comparative example illustrates the synthesis of the ethylenimine salt of oxalic acid of Formula XXII:

(XXII)

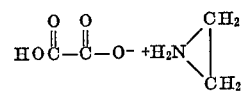

The preparation of the salt of Formula XII has been known since before the turn of the century and is described in 28 Berichte 2929 (1895).

Using the general procedure of Example I, 270.12 grams (3.00 moles) anhydrous oxalic acid was dissolved in 3000 ml. dry acetone. To this solution was added 129.21 grams (3.00 moles) ethylenimine, dropwise at 15–19° C. After complete reaction, the solid reaction product was filtered off and dried at room temperature in a hood to give a white solid, M.P. 102–103.5 with foaming, in a 98.2 percent yield.

Amine equivalent—Calculated for $C_4H_7NO_4$: 133.11. Found: 134.10.

Carboxyl equivalent—Calculated for $C_4H_7NO_4$: 66.55. Found: 73.13.

EXAMPLE XV

This comparative example illustrates the synthesis of a polyesteramide using the salt of Formula XXII. This polyesteramide has the undesirable property of being insoluble in styrene.

The reactants were charged to a reactor as described in Example IV. The charge consisted of 205.04 grams (1.54 moles) of the salt of Formula XXII, 151.04 grams (1.54 moles) of maletic anhydride, 123.04 grams (1.62 moles) propylene glycol and 250 ml. xylene. Using a nitrogen blanket the reactor was heated to 119° C. with exotherming over a 90-minute period. Heating was continued to 155° C. over a 3-hour period, at which time vacuum (6 mm. Hg) was applied and the remaining glycol, water and xylene distilled over. After 45 minutes the vacuum was removed and provisions were made to transfer the molten polyesteramide into a styrene solution containing 140 mg. toluhydroquinone (200 p.p.m. THQ). Upon attempting to dissolve the polyesteramide in styrene it was found that the polyesteramide was totally insoluble in styrene at all temperatures up to 120° C. At this temperature attempts to effect solution were terminated.

The insolubility of this polyesteramide in styrene renders it useless in the preparation of styrene cross linkable polyesteramides.

Although the invention has been described in considerable detail with reference to certain preferred embodiments thereof, it will be understood that variations and modifications can be effected within the spirit and scope of the invention as described above and as defined in the appended claims.

What is claimed is:

1. A polyesteramide of the formula:

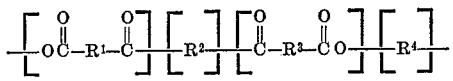

wherein:
$R^1$ is chlorinated or brominated alkylene, or chlorinated or brominated arylene;
$R^2$ is aminoalkyleneoxy or oxyalkyleneamino;
$R^3$ is alpha-beta ethylenically unsaturated alkylidene; and
$R^4$ is alkylene or alkylidene.

2. A polyesteramide of the formula:

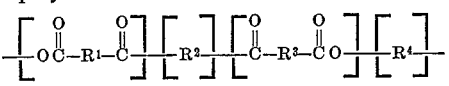

wherein:
$R^1$ is tetrachlorophenylene, tetrabromophenylene or

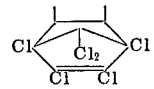

$R^2$ is

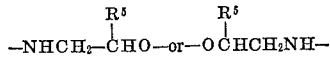

wherein $R^5$ is hydrogen or lower alkyl;
$R^3$ is

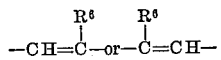

wherein $R^6$ is hydrogen or lower alkyl;
$R^4$ is lower alkylene or lower alkylidene.

3. A polyesteramide of claim 1 of the formula:

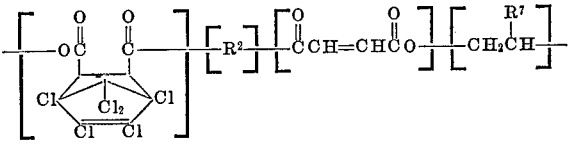

wherein:
$R^2$ is

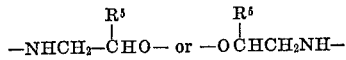

wherein $R^5$ is hydrogen or methyl;
$R^7$ is hydrogen or methyl.

4. A polyesteramide of claim 1 of the formula:

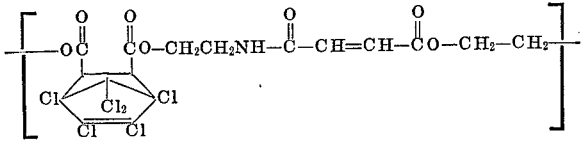

5. A polyesteramide of claim 1 of the formula:

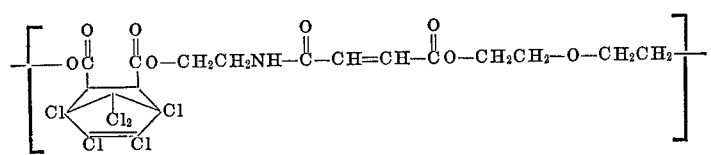

6. A polyesteramide of claim 1 of the formula:

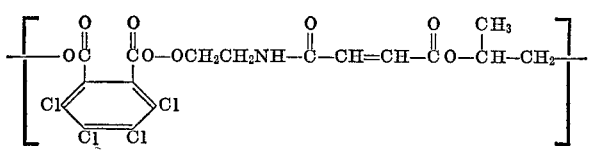

7. A polyesteramide of claim 1 of the formula:

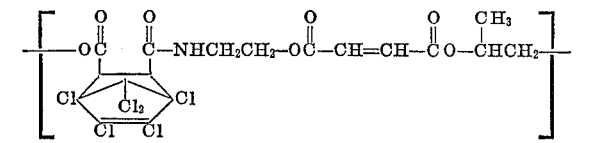

8. A composition of matter comprising the polyesteramide of claim 1 and a vinylmonomer.

9. The composition of claim 8 wherein the vinyl monomer is styrene.

10. The composition of claim 8 wherein the vinyl monomer and polyesteramide are present in a weight ratio of 10:1 to 1:10.

11. A laminate comprising fiber glass and a cured composition of claim 8.

12. A curable mixture consisting of styrene and a substantially linear, cross-linkable, unsaturated polyesteramide, the styrene and the polyesteramide being present in the mixture in a weight ratio of 3:1 to 1:3, the polyesteramide consisting essentially of recurring units of the formula

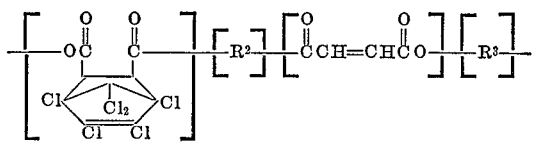

wherein $R^2$ is

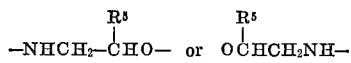

wherein $R^5$ is hydrogen or methyl; and
wherein $R^4$ is lower alkylene.

References Cited

UNITED STATES PATENTS

| | | | |
|---|---|---|---|
| 2,806,822 | 9/1957 | Ott | 260—2.5 |
| 3,354,126 | 11/1967 | Ham et al. | 260—78 |

FOREIGN PATENTS 466,270  5/1937  Great Britain.

OTHER REFERENCES

Bjorksten et al.: Polyesters And Their Applications, New York, N.Y., Reinhold Publishing Corp., 1956, p. 160.

ROBERT F. BURNETT, Primary Examiner

R. A. DAWSON, Assistant Examiner

U.S. Cl. X.R.

161—93, 233; 260—75 N, 239 E, 868, 870, 873

UNITED STATES PATENT OFFICE
CERTIFICATE OF CORRECTION

Patent No. 3,676,291           Dated July 11, 1972

Inventor(s) Ray C. Christena and Earnest L. Johnston

It is certified that error appears in the above-identified patent and that said Letters Patent are hereby corrected as shown below:

IN THE CLAIMS

Column 11, line 18, change "vinylmonomer" to -- vinyl monomer -- .

Column 12, the formula beginning at line 1, change "$R^3$" to -- $R^4$ -- .

Signed and sealed this 17th day of October 1972.

(SEAL)
Attest:

EDWARD M. FLETCHER, JR.          ROBERT GOTTSCHALK
Attesting Officer                Commissioner of Patents